Figure 1:
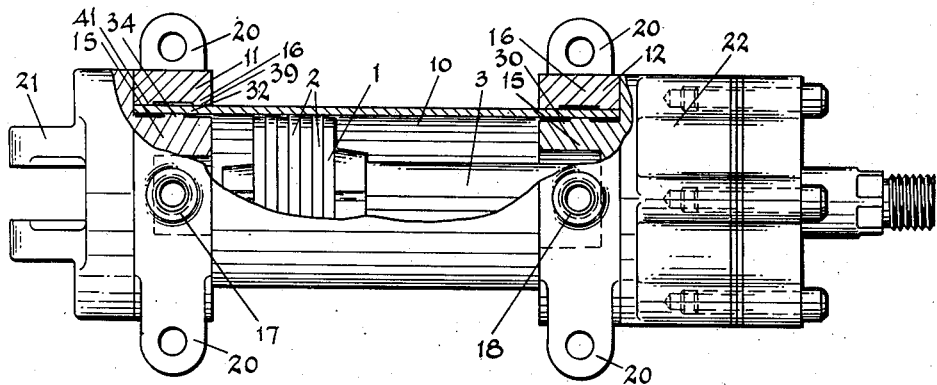

Feb. 8, 1949.                B. H. URSCHEL ET AL                2,461,132
                              FLUID PRESSURE UNIT
                              Filed Dec. 7, 1946

Inventors
Bertis H. Urschel
and Lorin H. Janzer
By
Attorney

Patented Feb. 8, 1949

2,461,132

UNITED STATES PATENT OFFICE 2,461,132

FLUID PRESSURE UNIT

Bertis H. Urschel and Lorin H. Janzer, Bowling Green, Ohio, assignors to Urschel Engineering Company, Bowling Green, Ohio, a corporation of Ohio Application December 7, 1946, Serial No. 714,726

7 Claims. (Cl. 309—2)

Our invention relates to fluid containing or retaining units and, particularly, those which, by virtue of their association with other devices or the conditions of their use, are required to retain fluids under pressure. Such units as fluid pressure cylinders and accumulators are illustrative of the particular field to which our invention is readily adaptable.

Our invention has for its prime object to provide marked improvements over the structure and invention disclosed in our copending application Serial No. 558,442, now Patent No. 2,414,492, filed October 12, 1944, for a Fluid pressure actuating device.

Like the structure of our said copending application, our present invention has for its object to provide a fluid pressure unit which may be readily assembled to produce a durable and efficient fluid pressure retaining unit, at a low cost.

The invention contemplates, in the main, the construction of a fluid pressure unit having a metal thin-walled shell of tubular contour and section, one or both ends of which are closed by a pair of metal engaging elements each of which, at temperatures normal to the use of the unit, exert counter-thermic pressures at points on spaced lines about the shell wall, to frictionally seal the parts and wall together.

The invention further contemplates that the thermic-pressure exerting points of one element shall be disposed in staggered or offset relation, axially and circumferentially speaking, to the correpsonding pressure exerting points of the other element. By this provision, the thermic pressure exerting points produce, in their respective engagement with the shell wall, spaced zones of pressure reaction. The zones of pressure reaction occur by reason of the disposition of the points producing the same, in substantial "meshing" sequence about and along the seized area of the shell wall. The "meshing" sequence and relation of such zones of pressure reaction is such as to effectively resist torque, in either direction, and thrust forces as may be exerted between the shell and metal engaging elements, without need of further provision.

The invention eliminates the need for machine threading of the shell or metal engaging elements or the need for bolting the parts together, as is practiced in the art prior to our invention. Consequently, the invention eliminates the costlier methods of the past and obtains advantages not attaching in such prior structures.

The invention consists in other features and advantages which will appear from the following description and upon examination of the accompanying drawing. Structures containing the invention may partake of different forms and still embody the invention. To illustrate a practical application of the invention, we have selected a fluid pressure unit and a modified form thereof as examples of the various structures and details thereof that contain the invention and shall describe the selected structures hereinafter, it being understood that variations may be made without departing from the spirit of the invention. The particular structures selected are shown in the accompanying drawing and described hereinafter.

Figure 2:
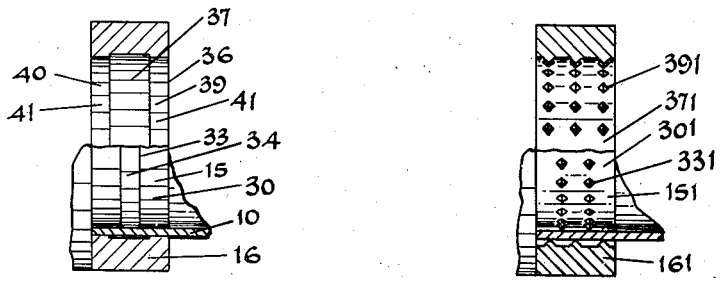
Figure 4:
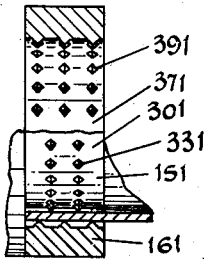
Figure 3:
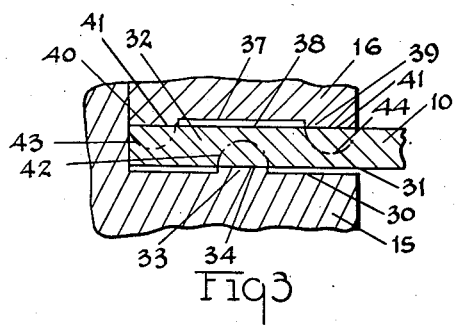
Figure 5:
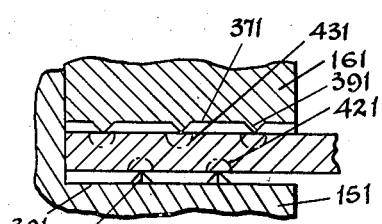

Fig. 1 of the accompanying drawing is a perspective view of the fluid pressure unit selected to illustrate an embodiment of our invention, portions of the unit being shown cut away and in section to facilitate an understanding of the details thereof. Fig. 2 is a view of a partial longitudinal section of the assembled shell and engaging elements, at one end of the unit shown in Fig. 1. Fig. 3 is an enlarged section showing the relation of the shell and engaging elements of the unit shown in Fig. 1 and diagrammatically illustrates the pressure zones which occur in the shell. Figs. 4 and 5 respectively, are similar views to those of Figs. 2 and 3, but show a modified form in the engaging means of the engaging elements with the shell and the pressure zones occurring in the shell, in diagrammatic indication.

The fluid pressure unit shown in the accompanying drawing is designed to perform a fluid cylinder function in relation to a piston 1, shown in position therein. The piston 1 has the usual rings 2 and piston rod 3. The lateral walls of the cylinder are formed by a shell 10, preferably formed of a thin-walled seamless tubing stock of uniform dimension and contour throughout its length. The open ends of the shell 10 are closed by end assemblies, generally indicated at 11 and 12. Each end assembly has a head element 15 and an end element 16. The head and end elements of each assembly have registering passageways which are in communication with ports. The ports may be connected to the conduits of a fluid pressure system, not shown, through which fluid is introduced into and discharged from within the shell 10. The port of the assembly 11 is indicated at 17 and that of assembly 12 at 18. The end element 16 of each assembly may have mounting brackets or ears 20 for attaching the unit to a suitable base. The head element 15 of each assembly may have attaching means, such as the clevis 21 on the head element 15 of the assembly 11 or the bearing and gland block 22 for the piston rod 3 provided on the head element 15 of the assembly 12. The head and end elements are, by virtue of these provisions, each of a considerable mass and rigidity and will withstand many of the structural stresses exerted in the physical system of which the unit may be a part, without transmission of the same to the thin wall of the shell 10. Such other structural stresses as may be exerted and the operating stresses produced within the cylinder chamber defined by the shell 10 are withstood by the shell in its hereinafter described relation with the elements 15 and 16 assembled in accordance with our invention. Since in the following particulars, the head and end elements 15 and 16 of each assembly 11 and 12 are identical, it will suffice to describe the elements of assembly 11, as shown in detail in Figs. 2 and 3 of the accompanying drawing.

The head element 15 preferably has a cylindrical surfaced portion 30 which may be finished to a diameter equal to or slightly less than that of diameter of the internal surface 31 of the open end portion 32 of the shell 10. A rim or annular collar 33 is formed on and circumscribes the cylindrical surfaced portion 30, preferably midway along the lateral length of the cylindrical surface 30 and in an orbital plane which extends at right angles to the axis of the portion 30. The annular collar 33 protrudes outwardly from the surface 30 and radially with respect to the axis thereof and has a flat top land surface 34. The diameter of the surface 34 of the annular collar 33 is exactly finished about an axis which is concentric with the symmetrical center of the shell open end portion 32, when the assembly is completed as hereinafter described, and to a circumferential lineal dimension slightly greater than that of the circumferential lineal dimension of the internal surface 31 of the shell open end portion 32.

The end element 16 has an opening 36 defined by a cylindrical surface 37 which may be finished to a diameter equal to or slightly greater than the diameter of the external surface 38 of the shell open end portion 32 and preferably is of a lateral dimension equal to the lateral dimension of the surface 30. The end element 16 may be of ring contour, as shown in the drawing, to accommodate the adjacent disposition of the head element 15. A rim or annular collar 39 is formed on and circumscribes the cylindrical surface 37 of the end element 16, preferably proximate to the opening 36 and in an orbital plane which extends at right angles to the axis of said surface 37. It is often desirable to form a second like rim or collar 40 on the surface 37, in spaced relation to the collar 39 and proximate to the end of the cylindrical surface 37 remote from the opening 36. The collars 39 and 40 protrude inwardly from the surface 37 and radially with respect to the axis thereof. Each collar has a flat top land surface 41. The diameter of each land surface 41 of the collars 39 and 40 is exactly finished about an axis which is concentric with the symmetrical center line of the shell open end portion 32, when the assembly is completed as hereinafter described, and to a circumferential lineal dimension less than that of the circumferential lineal dimension of the external surface 38 of the shell open end portion 32.

When the head and end elements 15 and 16 are assembled with the shell open end portion 32, the head element's cylindrical surfaced portion 30 is disposed within the open end portion 32 and thus assembled head element and shell end are disposed within the end element's cylindrical surface 37 to establish a substantial nested or telescoped relation between the elements and shell end portion. The land surface 34 of the collar 33 engages points on the surface 31 with considerable pressure in a radially outward direction producing a pressure reactive zone in the wall of the open end shell portion 32, diagrammatically outlined by the broken line indication 42, shown in Fig. 3 of the accompanying drawing. The land surfaces 41 of the collars 39 and 40 engage points on the external surface 38, in spaced and axially offset relation to the engagement of the internal surface 34 by the land surface 31. Preferably, the surface 41 of collar 39 engages external surface 38, on one side, and the surface 41 of collar 40 engages surface 38, on the other side of the engagement between the internal surface 31 and the land surface 34 of collar 33.

The surfaces 41 of collars 39 and 40 engage the surface 38 with considerable pressure, in a radially inward direction, producing pressure reactive zones in the wall of the open end shell portion 32, diagrammatically outlined by the broken line indications 43 and 44, shown in Fig. 3 of the accompanying drawing. It will be immediately apparent that the pressure reactive zones 43 and 44 are in "meshing" relation to the pressure reactive zone 42, insofar as concerns resistance to thrust or axially applied forces that may be exerted to dislodge the shell 10 from its assembly with the elements 15 and 16.

In order to effect assembly, the head element 15 is subjected to chilling temperatures below the temperatures at which the unit is to be subjected in use, such as a temperature of 20° to 30° F., when use temperature will approximate the 70° F. range. The head element is retained in the chilling temperatures for a sufficient period of time to produce heat saturation, at the selected low temperature. In response to such exposure, the head element 15 contracts sufficiently so that the diameter of the land surface 34 of the collar 33 is equal to or less than the diameter of the inner surface 31 of the shell open end 32.

The end element 16 is subjected to a high heating temperature above the temperatures at which the unit is to be subjected in use, such as a temperature of 900° to 1100° F., when use temperature will approximate the 70° F. range. The end element is retained in the heating temperature for a sufficient period of time to produce heat saturation, at the selected high temperature. In response to exposure of the end element to the high temperature, the end element expands sufficiently so that the diameters of the land surfaces 41 of the collars 39 and 40 are equal to or greater than the diameter of the external surface 38 of the shell open end 32.

The chilled head element 15 with its collar 33 is slid within the shell open end portion 32 and the heated end element 16 with its collars 39 and 40 is slid over the shell open end portion, preferably simultaneously. The operation may be effected by an assembly jig, such as that described in our said copending application.

As the elements 15 and 16 return to normal temperature, the element 15 exerts a considerable expansive force through contact between the land surface 34 and the internal surface 31 of the shell open end portion. Likewise, the end element 16 exerts a considerable contractive force through contacts between the land surfaces 41 and the external surface 38 of the shell open end portion. Thus, each element exerts counter thermic pressures on the shell, at a plurality of adjacent points, of which the respective collars are a composite, about the axis of the shell open end, upon the reestablishment of normal temperatures in the elements. The elements sustain the thin wall shell 10 against deformation and by reason of the thermic pressures exerted in axially offset "meshing" relation assure a high degree of frictional sealing engagement.

The modified form shown in Figs. 4 and 5 of the drawings differs, in the main, only in the form of the protruberances provided on the head and end elements. In lieu of the collars with their respective shell engaging land surfaces of the preferred form, a plurality of pyramidic tooth-like protruberances 331 and 391 are formed on the cylindrical surfaces 301 and 371 of the elements 151 and 161 shown in Figs. 4 and 5. The teeth 331 and 391 of the elements 151 and 161 are formed in spaced relation to each other circumferentially about their respective cylindrical surfaces 301 and 371 as well as axially with respect to said cylindrical surfaces and in non-registering and offset relation as between themselves. The teeth may be expediently formed by a knurling operation.

When the elements 151 and 161 are assembled, the teeth 331 engage the internal surface of the shell open end at points in staggered, offset relation to the points on the external surface of said shell open end engaged by the teeth 391. Hence, the teeth 331 produce pressure reactive zones 421 on the shell open end portion in "meshing" relation with the counter-active pressure reactive zones 431 produced by the teeth 391. The occurrence of such zones 421 and 431 is such as to not only resist thrust forces as may be applied between the shell and elements but also such torque forces as may be applied in either direction to the assembled parts.

The teeth 331, like the collar 33, extend radially outwardly and are arranged preferably in a pair of spaced rows, each row circumscribing the surface 301. Each tooth 331 of each row terminates on a continuous orbital or circular line extending about the axis of the cylindrical surface 301 in a plane extending at right angles to such axis and spaced from the symmetrical center of the shell open end a greater distance than that between the inner surface portions of the said shell open end engaged by the teeth and such symmetrical center. Hence, at temperatures normal to use of the assembly, the line of which said teeth 331 terminate is longer than the circumferential lineal dimension of the inner surface portions of said shell engaged by said teeth. So also, the teeth 391 extend radially inwardly and are arranged preferably in three spaced rows, each row circumscribing the surface 371. Each tooth of each row terminates on a continuous orbital or circular line extending about the axis of the cylindrical surface 371 in a plane extending at right angles to such axis and spaced from and alternating with the planes of the rows of teeth 331. The terminal lines of each row of the teeth 391 are spaced a lesser distance from the symmetrical center of the shell open end than that between the outer surface portions of the shell open end engaged by the teeth and such symmetrical center. Hence, at temperatures normal to use of the assembly, the line on which said teeth 391 terminate is shorter than the circumferential lineal dimension of the outer surface portions of said shell engaged by said teeth.

The modified elements 151 and 161 are assembled in the same manner as that described with reference to the preferred form and when assembled possess the added advantage of positively resisting torque in either direction as may be exerted between the shell and elements.

A specific example of the modified form shown in Figs. 4 and 5, which we find has not only good structural resistance but also an effective sealing characteristic, is one having a head and ring elements 151 and 161 in which the resultant thermic radial shrinkage and expansion are of the order between .009" and .016" measured along a diametric line extending through the axis of concentricity of the elements. We have found that the teeth 331 and 391, in a structure having the thermal expansion and shrinkage characteristics noted above, should be of a dimension in altitude, measured radially, of between .003" and .004" from the surfaces 301 and 371 respectively. Consequently, the shrinkage and expansion of the ring and head will be of the order so as to bring the surfaces of the shell 10 in intimate sealing contact with the surfaces 301 and 371 and thus effectively seal the shell to the ring and head.

While we have illustrated and described the best forms of our invention now known to us, as required by the statutes, those skilled in the art will readily understand that changes may be made without departing from the spirit of our invention as described and set forth in the hereto appended claims.

We claim:

1. A cylinder, for a fluid pressure operated device, having an open end shell forming the cylinder body and means for closing said open end comprising a head element, disposed within the open end of the shell, the head element having protruding portions extending radially outwardly with respect to an axis concentric with the symmetrical center of the open end and terminating at points on an orbital line extending about and in a plane at right angles to said concentric axis and of a greater length, at temperatures normal to cylinder use, than the circumferential lineal dimensions of the inner surface of said shell open end, and in said plane an end element having an opening within which the open end of the shell is located, and the element having protruding portions extending radially inwardly with respect to said concentric axis and terminating at points on an orbital line extending about and in a plane at right angles to said concentric axis and of a shorter length, at temperatures normal to cylinder use, than the circumferential lineal dimension of the external surface of said shell open end in said plane, the protruding portions of each element being offset from the protruding portions of the other element.

2. A cylinder claimed in the preceding claim 1 in which the protruding portions of each element are offset circumferentially, with respect to said concentric axis, from the protruding portions of the other element.

3. A cylinder claimed in the preceding claim 1 in which the protruding portions of each element are offset axially, with respect to the said concentric axis, from the protruding portions of the other element.

4. A cylinder as claimed in preceding claim 1 in which the protruding portions of one element are spaced from each other and the protruding portions of the other element are disposed between the spaced protruding portions of said one element.

5. A cylinder as claimed in preceding claim 1 in which the protruding portions of each element are spaced from each other and are disposed between the protruding portions of the other element.

6. A cylinder, for a fluid pressure operated device, having an open end cylindrical shell forming the cylinder body and means for closing said open end comprising a cylindrically shaped head element, disposed within the open end of the cylindrical shell and in concentric relation therewith, the head element having an annular collar, the outside diameter of which is longer than the internal diameter of said shell open end, at temperatures normal to cylinder use, and a ring element disposed around the said open end of the cylindrical shell and in concentric relation therewith and with said head element, the ring element having an annular collar, the inside diameter of which is shorter than the external diameter of said shell open end, at temperatures normal to cylinder use, the collars extending at right angles to the axis of said concentricity and being offset from each other along said axis.

7. In the combination of a chamber member for receiving and containing fluid, having a shell forming the body of the member and having an opening therein, the shell portion surrounding the opening extending through a distance along an axial line of projection of the opening's symmetrical center, and a part adapted to be connected to said opening surrounding shell portion; the provision of means for connecting said part to said shell portion comprising a first element disposed in nesting relation within the said shell portion having a plurality of surface points in engagement with surface points on the interior side of said shell portion and substantially diametrically located with respect to said symmetrical center line at greater distances from said symmetrical center line, when at temperatures normal to use of the chamber member, than the distance between the said engaged points on the shell portion interior and said symmetrical center line, and a second element disposed in surrounding relation to said shell portion having a plurality of surface points in engagement with surface points on the exterior side of said shell portion and substantially diametrically located with respect to said symmetrical center line at lesser distances from said symmetrical center line, when at temperatures normal to the use of the chamber member, than the distance between the said engaged points on the shell portion exterior and said symmetrical center line; the said first element's points being in a plane extending at right angles to said symmetrical center line and the said second element's points being in a second plane extending at right angles to said symmetrical center line and spaced from the plane of the first element's points, whereby the elements exert opposite thermic pressures along spaced radii emanating from said symmetrical center line to affix the part to the said shell portion.

BERTIS H. URSCHEL.
LORIN H. JANZER.

REFERENCES CITED

The following references are of record in the file of this patent:

UNITED STATES PATENTS

| Number | Name | Date |
| --- | --- | --- |
| 1,332,888 | Corson | Mar. 9, 1920 |
| 2,414,492 | Urschel et al. | Jan. 21, 1947 |

Certificate of Correction

Patent No. 2,461,132. February 8, 1949.

BERTIS H. URSCHEL ET AL.

It is hereby certified that errors appear in the printed specification of the above numbered patent requiring correction as follows:

Column 1, line 33, for "correpsonding" read *corresponding*; column 6, line 49, claim 1, strike out "in said plane"; same line, before "and" insert the words and comma *in said plane,*;

and that the said Letters Patent should be read with these corrections therein that the same may conform to the record of the case in the Patent Office.

Signed and sealed this 14th day of June, A. D. 1949.

[SEAL]

THOMAS F. MURPHY,
*Assistant Commissioner of Patents.*